United States Patent
Pinder et al.

(10) Patent No.: US 10,924,933 B2
(45) Date of Patent: Feb. 16, 2021

(54) SYSTEM AND METHOD FOR MONITORING THE INTEGRITY OF A VIRTUAL ASSISTANT

(71) Applicant: MOTOROLA SOLUTIONS, INC, Chicago, IL (US)

(72) Inventors: Ellis A. Pinder, Davie, FL (US); Matthew E. Simms, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 166 days.

(21) Appl. No.: 16/110,809

(22) Filed: Aug. 23, 2018

(65) Prior Publication Data

US 2020/0068406 A1   Feb. 27, 2020

(51) Int. Cl.
*H04L 29/06* (2006.01)
*H04W 12/10* (2021.01)
*H04L 12/24* (2006.01)
*H04L 12/26* (2006.01)

(52) U.S. Cl.
CPC .......... *H04W 12/10* (2013.01); *H04L 41/145* (2013.01); *H04L 43/50* (2013.01); *H04L 63/1425* (2013.01)

(58) Field of Classification Search
CPC ...... H04W 12/10; H04L 41/145; H04L 43/50; H04L 63/1425
See application file for complete search history.

(56) References Cited

U.S. PATENT DOCUMENTS

| | | | |
|---|---|---|---|
| 4,903,321 A * | 2/1990 | Hall | H04L 1/1607 455/515 |
| 6,195,415 B1 | 2/2001 | Shimoda et al. | |
| 6,782,530 B1 * | 8/2004 | Pincus | G06F 16/353 717/124 |
| 6,931,545 B1 | 8/2005 | Thanh et al. | |
| 7,630,708 B2 | 12/2009 | So et al. | |
| 7,796,023 B2 * | 9/2010 | Rezvani | G06F 21/31 340/506 |
| 8,135,353 B1 | 3/2012 | Schurman | |
| 9,316,739 B2 | 4/2016 | Bertin De La Hautiere et al. | |
| 9,436,725 B1 | 9/2016 | Aithal et al. | |
| 9,444,717 B1 | 9/2016 | Aithal et al. | |
| 10,263,863 B2 * | 4/2019 | Mukerji | H04L 63/102 |
| 10,270,794 B1 * | 4/2019 | Mukerji | H04L 63/1458 |
| 2012/0166335 A1 | 6/2012 | Bakshi et al. | |

(Continued)

*Primary Examiner* — Hosuk Song
*Assistant Examiner* — Stephen T Gundry
(74) *Attorney, Agent, or Firm* — Barbara R. Doutre

(57) ABSTRACT

A virtual assistant (VA) integrity monitor is provided to interface with a computer aided dispatch (CAD) center to ensure reliability of a VA server operating with a communication system. The VA integrity monitor generates a test query which is perceived by the VA server as being a real, user-generated query to which the VA server responds. The VA integrity monitor verifies that a response provided by the VA server meets predetermined criteria and communicates a result to the CAD center. The CAD center advantageously recognizes that the request and the response are based on a simulated test and therefore does not take action on either the query or the response. When the VA integrity monitor verifies that a response provided by the VA server does not meet the predetermined criteria, the CAD system can send out an alert.

24 Claims, 3 Drawing Sheets

(56) References Cited

U.S. PATENT DOCUMENTS

| | | | | |
|---|---|---|---|---|
| 2012/0254401 | A1* | 10/2012 | Adams | H04L 12/2818 709/224 |
| 2013/0197951 | A1* | 8/2013 | Watson | G06Q 10/06 705/7.12 |
| 2015/0134682 | A1* | 5/2015 | Wesley | G06F 15/173 707/756 |
| 2016/0065416 | A1* | 3/2016 | Rezvani | G06F 21/31 715/740 |
| 2016/0087933 | A1* | 3/2016 | Johnson | H04W 12/0023 709/245 |
| 2016/0112262 | A1* | 4/2016 | Johnson | H04L 61/1511 709/221 |
| 2016/0277970 | A1* | 9/2016 | Werneke | G06F 11/00 |
| 2017/0272316 | A1* | 9/2017 | Johnson | H04L 67/141 |
| 2017/0289168 | A1 | 10/2017 | Bar et al. | |
| 2017/0318084 | A1* | 11/2017 | Giffin | H04L 63/105 |
| 2018/0020021 | A1* | 1/2018 | Gilmore | H04L 63/1441 |
| 2018/0262533 | A1* | 9/2018 | McCaig | H04L 63/0209 |
| 2018/0302334 | A1* | 10/2018 | Osterlund | H04L 12/2801 |
| 2018/0352031 | A1* | 12/2018 | Hornquist Astrand | H04L 9/0825 |
| 2019/0052554 | A1* | 2/2019 | Mukerji | H04L 43/04 |
| 2019/0124049 | A1* | 4/2019 | Bradley | H04L 63/164 |
| 2019/0158353 | A1* | 5/2019 | Johnson | H04L 63/105 |
| 2019/0173919 | A1* | 6/2019 | Irimie | G06F 21/577 |
| 2019/0174208 | A1* | 6/2019 | Speicher | H04Q 9/00 |
| 2019/0197911 | A1* | 6/2019 | Anderson | G06F 21/604 |
| 2019/0199759 | A1* | 6/2019 | Anderson | G06Q 30/0283 |
| 2019/0205468 | A1* | 7/2019 | Barnes, Jr. | G10L 15/26 |
| 2019/0205511 | A1* | 7/2019 | Zhan | G06F 21/316 |
| 2019/0253445 | A1* | 8/2019 | Mukerji | H04L 63/1458 |
| 2019/0372655 | A1* | 12/2019 | Pinder | G06F 3/167 |
| 2019/0373112 | A1* | 12/2019 | Jensen | H04L 12/66 |
| 2019/0378397 | A1* | 12/2019 | Williams, II | G06N 5/043 |
| 2020/0058305 | A1* | 2/2020 | Yang | H04M 3/5191 |
| 2020/0074839 | A1* | 3/2020 | Trigg | G06F 16/43 |
| 2020/0092293 | A1* | 3/2020 | Liu | G06F 16/9535 |

\* cited by examiner

US 10,924,933 B2

SYSTEM AND METHOD FOR MONITORING THE INTEGRITY OF A VIRTUAL ASSISTANT

FIELD OF THE INVENTION

The present invention relates generally to radio communication systems and more particularly to the application of virtual assistant in radio communication systems.

BACKGROUND

Communication systems, such as public safety communication systems, have had limited opportunity to take advantage of virtual assistant searching capabilities. However, there is an increased desire to incorporate virtual assistant capabilities into public safety communication systems, if improvements could be made in the reliability of the virtual assistant. The ability to acquire the most accurate and up-to-date response along with response timing are important considerations in the management of virtual assistant search queries operating in public safety environments. Complex tasks, such as those associated with such as mission critical environments, need to be performed and managed in a reliable fashion. There is a need to ensure a virtual assistant is operating correctly within the public safety system and has not been compromised.

Accordingly, there is a need for improving the management of virtual assistant capabilities within a communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
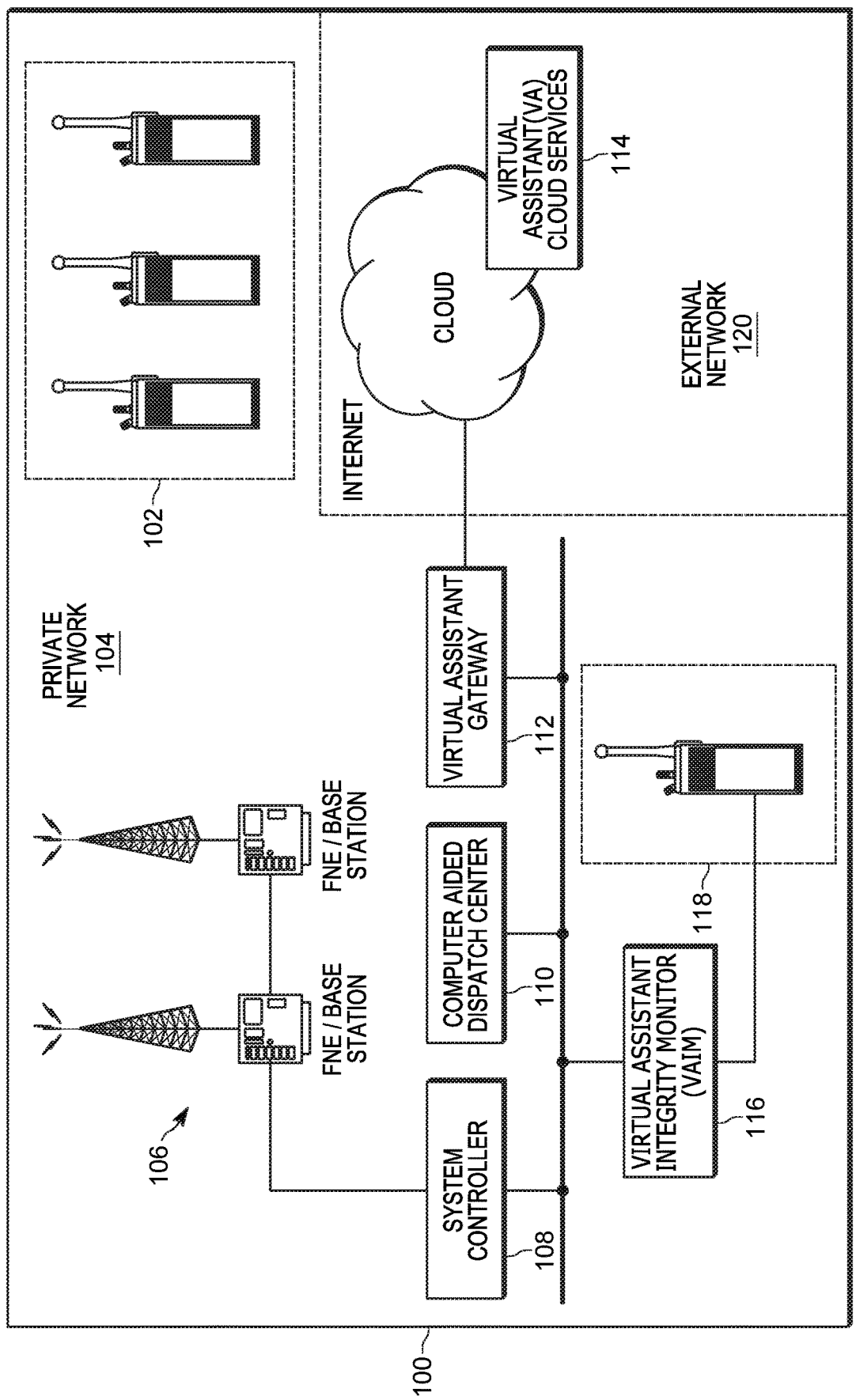
FIG. 1 is a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided a communication system having improved virtual assistant capability. In accordance with the embodiments, a virtual assistant (VA) integrity monitor is provided to interface with a computer aided dispatch (CAD) center to ensure reliability of natural language processing and query response operation provided by a VA server within the communication system. The VA integrity monitor generates test queries which are perceived by the VA server as being real user-originated queries to which the VA server responds. The VA integrity monitor verifies that a response provided by the VA server meets pre-determined criteria, such as accuracy and timeliness, and communicates a result to the CAD system if the result is found to be otherwise. The CAD center advantageously ignores test queries as the request itself may represent some actionable content, and the CAD center further ignores the eventual responses to the test queries. The CAD system advantageously recognizes that the result is based on a test query as previously informed by the VA integrity monitor and therefore does not broadcast the response to other radios within the communication system or take any actions, such as escalation or alert generation from the request or the subsequent response. When invalid responses to test queries are detected, then actions, such as escalation and/or alert generation, may be taken, however broadcasting of test queries and responses remains suppressed. The system is thus able to conduct non-intrusive testing of a virtual assistant feature. For the purposes of this application test queries may also be considered test requests.

FIG. 1 shows a communication system 100 formed and operating in accordance with some embodiments. Communication system 100 comprises a plurality of wireless communication devices 102 operating over a private network 104. The private network 104 comprises at least one base station 106, also referred to as fixed network equipment (FNE), under the control of a system controller 108. The private network 104 further comprises at least one computer aided dispatch (CAD) center 110 communicatively coupled with the system controller 108. The wireless communication device 102 communicates with other like devices as well as with the CAD center 110 over the private network 104.

In accordance with the embodiments, at least one of the communication devices 102 is further provided with access to a virtual assistant (VA) server 114 of an external network over a virtual assistant (VA) gateway 112. The VA gateway 112 provides access to the VA server 114 over a cloud based internet 120, thereby communicatively coupling the private network 104 to the cloud based VA services. The VA server 114 operating over the cloud based internet 120 provide language processing and response capability through the use of artificial intelligence. Virtual assistants, such as Siri provided by Apple, Inc.® and Google Assistant provided by Google, Inc.®, are software applications that understand natural language and complete electronic tasks in response to user inputs. The communication device 102 may be any broadband or narrowband device having a microprocessor, transceiver, and audio circuitry, such as a radio, a cell phone or the like, for receiving a verbal or data query user input for transmission to the VA server 114.

In accordance with the embodiments, communication system 100 further comprises a virtual assistant (VA) integrity monitor 116 communicatively coupled to both the CAD center 110 and the VA server 114. In accordance with the embodiments, the VA integrity monitor 116 sends a test query through VA gateway 112 to the VA server 114. The test query generated from the VA integrity monitor 116 simulates a query from a communication device of the communication system. The VA integrity monitor 116 then compares a result generated by the VA server to a pre-stored, expected result or a dynamically updated expected result. The VA integrity monitor 116 generates a failure alert when the response fails to match the pre-stored expected result. The failure alert is sent from the VA integrity monitor 116 to the CAD center 110. The CAD center 110 is typically manned by a human who would initiate corrective action to address the failure.

The test query may be a random test query selected based on static and/or non-static facts which the virtual assistant (VA) server 114 is expected to be able to respond to when operating properly. Such facts may be known to the VA server 114, by being previously stored on the VA server (static) or acquired by the VA server (dynamic), such as by going over the internet and/or acquired by the VA server from the CAD center 110 For example, dynamic updates and observations may be made to the VA server 114 based on prior requests/responses handled by the VA integrity monitor 116. The random test query to the VA server 114 may be in the form of verbal queries or a combination of verbal with text query generated by the VA integrity monitor 116. The random query can also be selected to focus on predetermined test vectors, such as queries related to mission critical data anticipated within the operation of a public safety communication system, such as a land mobile radio (LMR) communication system. The ability to monitor mission critical queries and responses (,i.e. was the response correct) facilitates the detection of malicious tampering of the virtual assistant. The VA integrity monitor may inform the CAD center of vectors being used in the testing, so that the CAD can identify radios operating within a specific context that may be more amenable to testing, for example a radio sitting in a charger (out of use), or a radio ID not currently assigned to a user. Hence, assigned IDs not presently affiliated with the system can be used. This ensures the cloud base virtual assistant cannot identify dedicated IDs used for testing. Hence, contextually accurate test vectors can be developed for testing the cloud based virtual assistant server.

In accordance with the embodiments, the VA integrity monitor 116 may further provide analytics as to the test results by logging and tracking both correct responses and incorrect responses to determine instantaneous and/or average latency, context parameters, need for VA updates to the VA server 114, and/or identification of a potentially compromised VA server 114, such as may be caused from a malicious cyber-attack. The overall integrity of the communication system is thus improved. In some embodiments, it may be that a combination of events, outside of a pre-identified threshold for 'correct' operation must be exceeded to elevate the condition to the CAD center 110. This allows for normal, expected variations that are not signs of malicious tampering or denial of service attacks on the virtual assistant server 114. In accordance with some embodiments, the VA integrity monitor 116 operation may simulate that of a real radio by requesting a radio test identification (ID) from the CAD center 110 or the VA integrity monitor itself for temporarily entering a test mode for testing the VA server 114. For embodiments in which the radio test ID is requested from the CAD center 110, the CAD center may assign the radio test ID based on a variety of factors, such as a radio ID of a known radio not presently affiliated with the system. For embodiments in which the radio test ID is requested from the VA integrity monitor itself. The VA integrity monitor 116 has knowledge of unused IDs, or unused radios from other information or databases. The VA integrity monitor 116 would then inform the CAD center 110 of the ID it has selected. This approach makes the VA integrity monitor 116 more autonomous and random such that it can control the variety of IDs brought under test. Both approaches facilitate ensuring that the VA server, which is under test, does not recognize "known Test IDs". The VA server 114 interprets the test query as being an authentic user query and generates a response accordingly, thereby providing for a transparent testing conditions. The VA integrity monitor 116 checks the validity of the VA response for the assigned radio test ID. The CAD center 110 suppresses broadcasting responses generated by the VA server 114 for the ID under test (i.e. both valid and invalid responses are suppressed if resulting from a test). The CAD center can thus advantageously suppress alerts or other escalations that are specifically generated from VA integrity monitor, such as test requests that indicate contextual events that imply trouble and life threatening situations. For example, a VA test for "Radio 1234" is sent from the VA integrity monitor 116 to the VA server 114 comprising the voice message "Help, I've been shot", wherein the VA server 114 would normally generate a response to the user and initiate a critical alert indication to a dispatcher at the CAD center 110. For this particular test, the CAD center 110 receives the critical alert indication but suppresses it, as the CAD center knows that this particular radio ID is presently under test as previously arranged with the VA integrity monitor 116. In some embodiments, the VA integrity monitor 116 may notify the CAD center 110 of any failures or performance degradation. Certain types of failure deemed critical will result in immediate human notification. The failures may be based on individual response failures for a particular radio ID or tracked analytics identifying system issues, such as latency problems, incorrect response information, and unauthorized data access to name a few. The communication system advantageously provides a non-interference approach to VA response validation without broadcasting queries and response to other devices.

In some embodiments the virtual assistant (VA) integrity monitor 116 may be embodied as a computer, such as a computer on a test rack, coupled to the private network 104. In some embodiments, the VA integrity monitor 116 may be integrated into the CAD center 110 itself such that the VA integrity monitor and the CAD center 110 share common, physical computing elements. Accordingly, in some embodiments, some elements of system 100 in FIG. 1 may be viewed as logical elements and not necessarily physical elements. The VA integrity monitor 116 may further utilize a dedicated radio 118 for synthesizing the test query. The validation of responses provided by the VA integrity monitor 116 thus provides for non-intrusive testing of VA responses in the system. Such non-intrusive testing is highly beneficial to public safety communication systems and particularly those systems where missing critical queries may be anticipated, such as land mobile radio (LMR) communication systems. The VA integrity monitoring, regardless of where it is embodied, comprises processing capability via a controller, a memory, a receiver and a transmitter.

Figure 2:
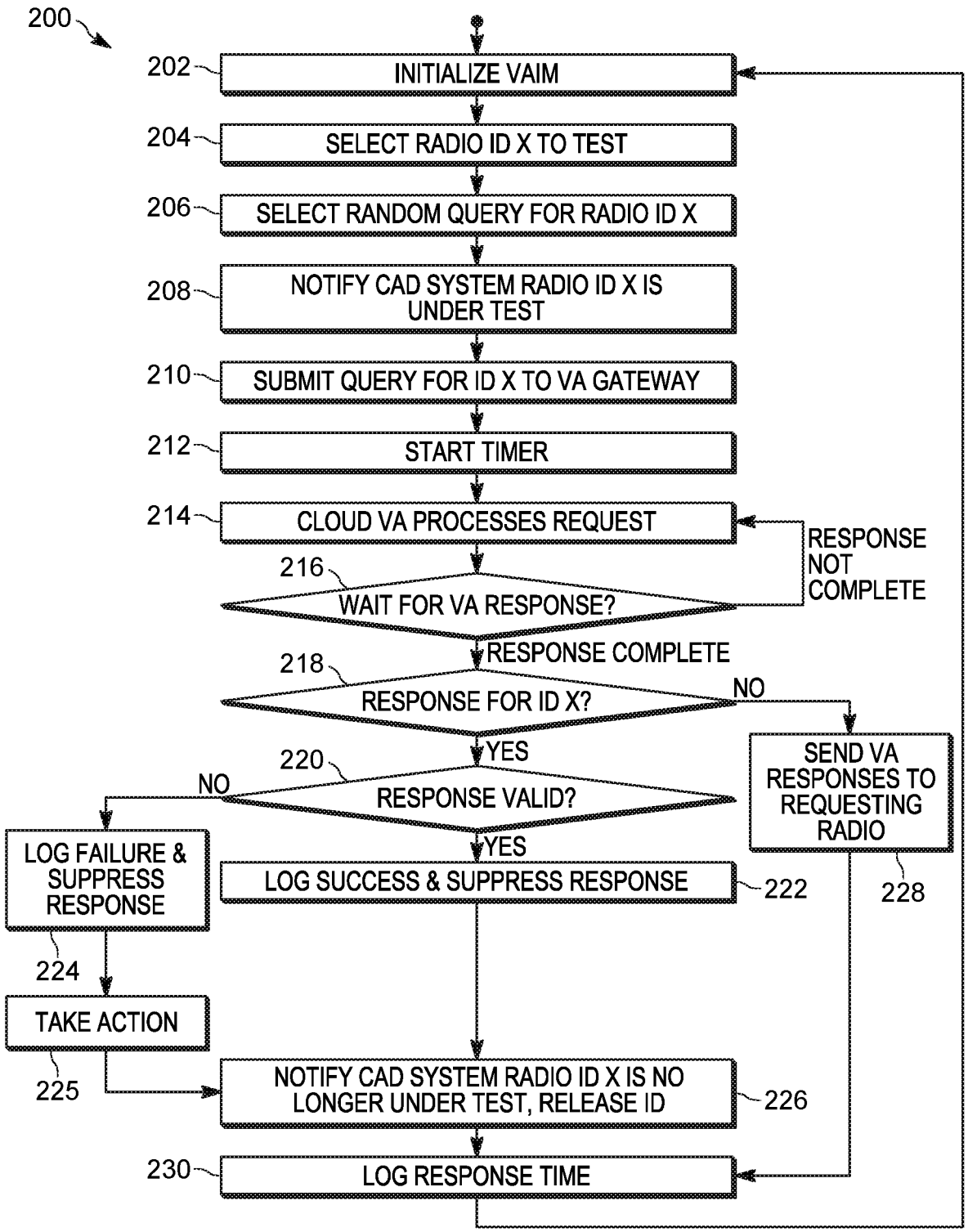
FIG. 2 is a flowchart of a method for monitoring the integrity of a virtual assistant in accordance with some embodiments.

FIG. 2 is a flowchart of a method 200 for monitoring the integrity of a virtual assistant in accordance with some embodiments. The method 200 begins at 202 by initializing a virtual assistant (VA) integrity monitor, such as described in FIG. 1, followed by selecting a radio ID to test at 204. The radio ID to test may be that of a non-real radio simulated by the VA integrity monitor 116 or a dedicated test radio ID, or the radio ID may be assigned from a computer aided dispatch (CAD) center, such as the CAD center 110 of FIG. 1. A random test query for that radio ID is then selected at 206 by the VA integrity monitor.

The random test query may be selected based on static and/or non-static facts which a virtual assistant (VA) server, communicatively coupled to the system, is expected to be able to respond to when operating properly. Such facts may be known to the VA server, by being previously stored on the VA server or acquired by the VA server by observing the data as it is originated from the field and accepted by the VA server and/or acquired by the VA server from the CAD center. The test query to the VA server may be in the form of verbal queries or a combination of verbal with text query generated by the VA integrity monitor.

The selection of a static query seeks out a response that provides factual information that is expected to remain consistent. For example, "What is the address for the municipal courthouse?", "How many speeding records were generated last week?", "What is the cell phone contact number for the captain of the SWAT Team", Who is the senior officer in the Lakeside district?", and the like. The selection of a non-static test query seeks out responses that provide information that can vary dynamically and, in accordance with some embodiments, may be "on-premise" test queries and responses. Dynamic test queries and responses may be those that pertain to factual information that can vary over time of day, day of the week, quantity, people, job assignment changes, to name a few. Example of dynamic queries and responses might include but are not limited to: "How many speeding tickets were generated so far this morning?", "How many patrol cars have currently been sent to the scene of the accident?", "Which officers are on foot patrol this afternoon?", Which canine dogs are currently assigned to the search and rescue scene", and "What time was noted for the accident involving the red Corvette on $3^{rd}$ street this morning?", to name a few.

A notification is sent at 208 to the CAD center, from the VA integrity monitor, to notify the CAD center that the VA integrity monitor is going to initiate a test for radio ID 'X'. Notification of test mode operation advantageously prevents the CAD center from reacting to the test thereby preventing generation of CAD system alerts or the broadcasting of messages, all resulting from VA responses stimulated by tests originating from the VA integrity monitor. Hence, only a specific ID is in test mode, thereby advantageously allowing the communication system to continue normal communication operations in parallel.

The test query is submitted over a virtual assistant gateway to the VA server at 210, thereby simulating a real radio ID and simulating a real query from the standpoint of the VA server. Hence, the VA server is unaware of the actual originator of the query and is unaware that the query is a test query. A timer is started at 212 to determine how much time is taken for the VA server to process the test query at 214 and for generation of a response at 216. A timing loop monitors in-cloud response timing for processing the test query and generating the response.

At 218, the method checks whether a response generated by the VA server is intended for a particular radio test II). Step 218 facilitates the management of a plurality of responses being paired up appropriately with a respective plurality of queries being entered under independent radio test IDs. If a generated response is identified as being intended for a particular test ID at 218, then a check is made by the VA integrity monitor as to whether the response is valid at 220. The determination of validity is made by the VA integrity monitor based on a pre-stored facts within the VA integrity monitor and dynamically updated factual information to the VA integrity monitor. Hence, the VA integrity monitor provides fact-checking capability of a VA response.

When the response is determined to be valid at 220, then a success is logged by the VA integrity monitor and the successful response is suppressed from being broadcast at 222. A notification is sent, by the VA integrity monitor, to the CAD center to release the radio ID at 226, as testing is completed. The response time, in this case the response time for a valid response, is logged at 230.

When the response is determined to be invalid at 220, then a failure is logged at 224 and the generated response is also suppressed. Appropriate actions may be taken at 225 to address the failure, including sending notifications to a CAD dispatcher of the CAD center and/or system manager of the system controller. A notification is sent, by the VA integrity monitor, to the CAD center to release the radio ID at 226, as testing is completed. The response time, in this case the response time for a valid response, is logged at 230.

The logging of a failure at 224 can further initiate a failure notification being generated indicative of failed responses. It is particularly beneficial to generate a failure notification when the failed response relates to a mission critical test query. The non-intrusive approach provided by method 200 is particularly beneficial to public safety communication systems.

Returning back to 218, when a determination is made, by the VA integrity monitor, that the response generated by the VA server is not intended for a current radio test ID, then the generated response and radio ID are determined to be associated with a normal radio operating under normal (non-test) operating VA query and response conditions. The response is sent to that requesting radio at 22.8 and the response time is logged at 230. Thus, a response to a real, non-test query, will be routed to the requesting radio. This facet of method 200 may be provided to the method as an additional check to ensure that regular queries and responses are not inadvertently suppressed under a testing situation.

Figure 3:
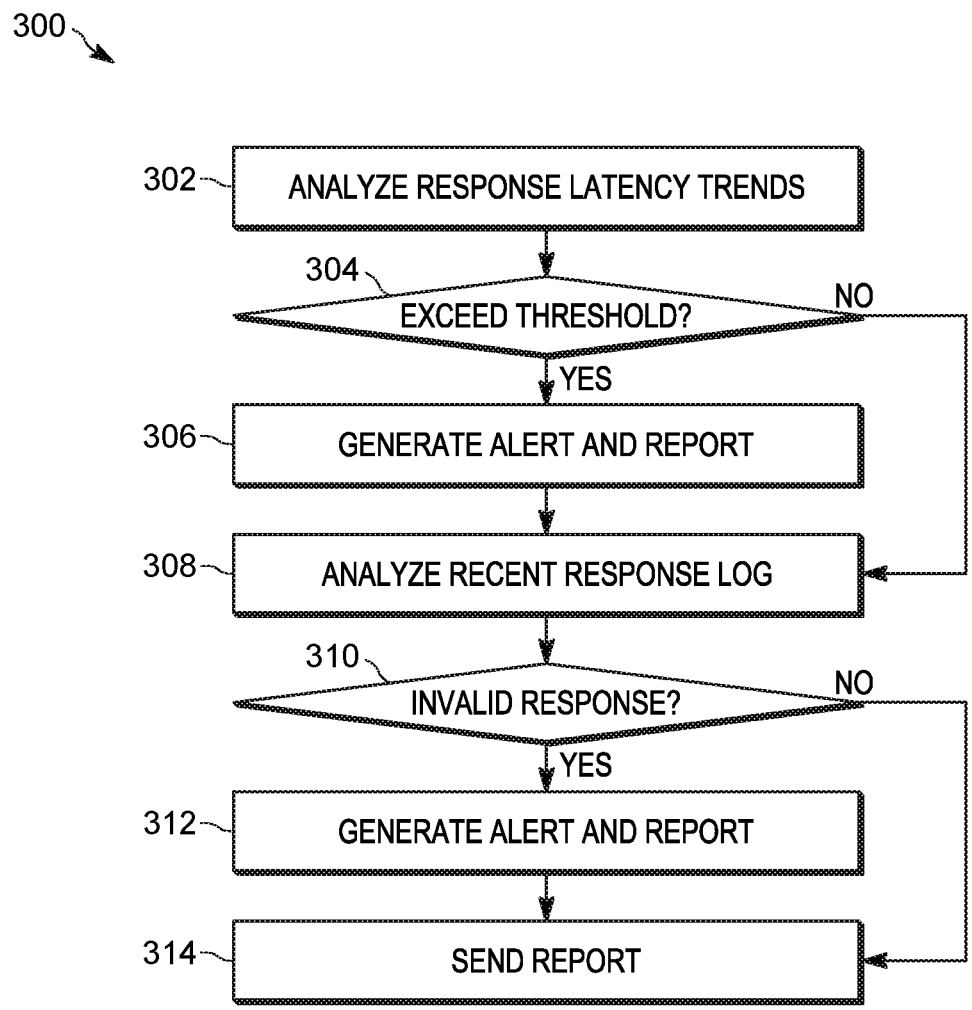
FIG. 3 is a flowchart of a method 300 for analytical processing that can further take place in parallel with the method of monitoring the integrity of a virtual assistant in accordance with some embodiments.

FIG. 3 is a flowchart of a method 300 for analytical processing that can further take place in parallel with the method of monitoring the integrity of a virtual assistant in accordance with some embodiments. Method 300 provides for a plurality of actions that can be taken by the virtual assistant (VA) integrity monitor to track analytics and perform metrics based on the response generated by the VA server. At 302, the method determines latency trends for responses generated in response to test queries. So, not only can the VA integrity monitor determine if a valid response was generated to the test query, but how long did the valid response take to generate, and whether the system is slowing down. At 304, timing of a response threshold drifting over time may be indicative of the need for additional computer capacity or the need to additional memory storage space. A report and alert can be generated at 306 indicative of time lags and time shifts. Recent response logs can be analyzed at 308 for invalid responses, so that redundant testing can be applied. If invalid response(s) are determined at 310, then a failure alert and report identifying particular invalid responses can be generated at 312. Reports and alerts can be sent to at step 314, for example to a system manager, so that appropriate action may be taken, including additional testing, maintenance or upgrades. Additionally, alerts may also be directed to a human operator at CAD center 110 of FIG. 1, particularly if a detected issue is safety-related or is indicative of major functional impairment of the VA server 114.

Timers can be set to monitor the reports over various time periods, such as time periods associated with work shifts, timing associated with particular public safety events. For example, testing of the integrity of a VA server being used within a public safety system may be monitored and tested during law enforcement events, fire rescue events, and timers set for random monitoring of the integrity of the system during regular operation.

The parallel processing provided by method 300 can provide and monitor test vectors. Such test vectors may operate based on a plurality of factual information, such as static facts, dynamic facts, known/pre-stored facts, time based facts, contextual facts, and facts acquired over the internet. The parallel processing of method 300 advantageously provides analytics of the query testing and response to maintain the first responder's ability to communicate with the VA server.

The methods 200, 300 can be summarized as a method for monitoring a communication system by providing a virtual assistant (VA) integrity monitor to a private system, selecting a virtual assistant (VA) test query, requesting a radio test ID from a computer aided dispatch (CAD) center, sending the VA test query and the radio test ID to the VA server for processing, receiving the VA response from the VA server, comparing the VA response to an expected result, and generating a failure alert when the VA response does not match the expected result.

The VA integrity monitor can be implemented as a computer communicatively coupled to the communication system, a dedicated radio operating within the communication system, and/or a normal radio with test mode capability operating within the communication system. The validation of responses provided by the VA integrity monitor advantageously provides for non-intrusive testing of VA responses in a communication system. Public safety communication systems, such as those that handle law enforcement, fire, and rescue operations, will be better able to make use of external VA systems, knowing that the system is being monitored. The ability to monitor the integrity of the external VA system via test queries and responses for performance and accuracy in an unobtrusive manner minimizes disruption to radio system operation and dispatcher workflow and provides for the detection of malicious tampering. The coordination of the VA integrity monitor to the CAD center further allows for the dynamic use of radio IDs to prevent the external VA system from discerning between a VA test session and a real VA session.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication system, comprising:
a private network;
a computer aided dispatch (CAD) center operating within the private network;
a plurality of communication devices operating over the private network;
a virtual assistant (VA) server communicatively coupled to the private network; and
a virtual assistant (VA) integrity monitor communicatively coupled to both the CAD center and the VA server, the VA integrity monitor verifying performance of the VA server by sending a radio test ID and a test query to the VA server and comparing a response generated by the VA server to an expected result, the VA integrity monitor generating a failure alert when the response fails to match the expected result, the alert indicating a degradation in VA server performance.

2. The communication system of claim 1, wherein the test query from the VA integrity monitor simulates a query from a wireless communication device of the communication system.

3. The communication system of claim 2, wherein the failure alert generated from the VA integrity monitor is sent to the CAD center.

4. The communication system of claim 1, wherein the VA integrity monitor requests the radio test ID to test the VA server by temporarily entering a test mode associated with the radio test ID, and wherein the radio test ID is provided by at least one:
the computer aided dispatch (CAD) center; and
the VA integrity monitor itself.

5. The communication system of claim 4, wherein the CAD center suppresses taking action on the test query and test response.

6. The communication system of claim 1, wherein the VA integrity monitor is operatively coupled to the private network as an independent server.

7. The communication system of claim 1, wherein the VA integrity monitor performs and tracks analytics pertaining to the responses generated by the VA server.

8. The communication system of claim 1, wherein the VA integrity monitor generates and monitors mission critical test queries and responses within a public safety communication system.

9. The communication system of claim 1, wherein the VA integrity monitor detects malicious tampering of the VA server based on the test query and response.

10. The communication system of claim 1, wherein the VA server operates over a cloud based internet providing language processing and response capability through artificial intelligence.

11. A method for monitoring a communication system, comprising:
providing a virtual assistant (VA) integrity monitor to the communication system;
selecting a virtual assistant (VA) test query by the VA integrity monitor;
selecting a radio test ID on the communication system;
sending the VA test query and the radio test ID to a virtual assistant (VA) server for VA processing for performance verification;
receiving a virtual assistant (VA) response from the VA server in response to the VA test query;
comparing the VA response to an expected result at the VA integrity monitor; and
generating a failure alert, by the VA integrity monitor, when the VA response does not match the expected result, the alert indicating a degradation in VA server performance.

12. The method of claim 11, further comprising:
suppressing taking action on the VA test query and VA response.

13. The method of claim 11, further comprising:
sending a notification from the VA integrity monitor to a computer aided dispatch (CAD) center to notify the CAD center that the VA integrity monitor is going into test mode thereby preventing the CAD center from broadcasting the VA test query and VA response.

14. The method of claim 11, wherein the radio test ID is that of a non-real radio simulated by the VA integrity monitor.

15. The method of claim 11, wherein the radio test ID is that of a real radio operating within the communication system in a temporary test mode.

16. The method of claim 11, wherein random test query is based on facts known to the VA server.

17. The method of claim 16, wherein the facts known to the VA server comprise static facts and non-static facts.

18. The method of claim 17, wherein the static facts are previously stored to the VA server, and the non-static facts are dynamic facts acquired by the VA server from a computer aided dispatch (CAD) center based on observations of prior test queries and responses made by the VA integrity monitor prior to the VA test query.

19. The method of claim 11, wherein the test query to the VA server comprises at least one of:
a verbal query generated by the virtual assistant (VA) integrity monitor; and
a combination of verbal with text query generated by the VA integrity monitor.

20. The method of claim 11, wherein sending the VA test query and the radio test ID further comprises:
sending the VA test query and the radio test ID over a VA gateway to the VA server, thereby simulating a real radio ID and real query to the VA server.

21. The method of claim 11, wherein the VA integrity monitor generates and monitors mission critical test queries and responses within a public safety communication system.

22. The method of claim 11, wherein analytical processing take places in parallel with the monitoring.

23. The method of claim 11, wherein the communication system operates in a normal communications mode in parallel with the monitoring.

24. the method of claim 11, wherein the VA server operates over a cloud based internet providing language processing and response capability through artificial intelligence.

* * * * *